Jan. 27, 1970  N. SZEREMY ET AL  3,492,534
FUSE SPARK GAP DEVICE FOR PROTECTION AGAINST LINE
TRANSIENT VOLTAGES
Filed Oct. 31, 1967  2 Sheets-Sheet 1

INVENTORS:
NORMAN SZEREMY,
WALTER KATUSCHENKO,
BY
THEIR ATTORNEY

Jan. 27, 1970     N. SZEREMY ET AL     3,492,534
FUSE SPARK GAP DEVICE FOR PROTECTION AGAINST LINE TRANSIENT VOLTAGES
Filed Oct. 31, 1967     2 Sheets-Sheet 2
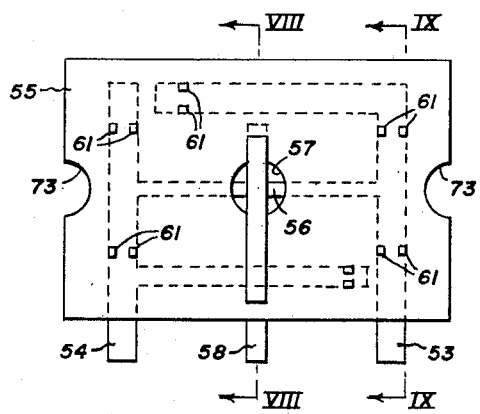
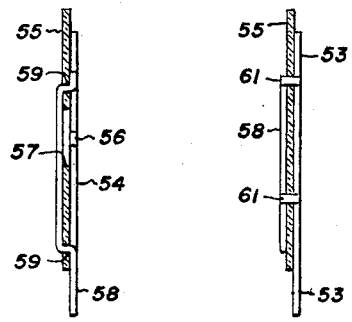
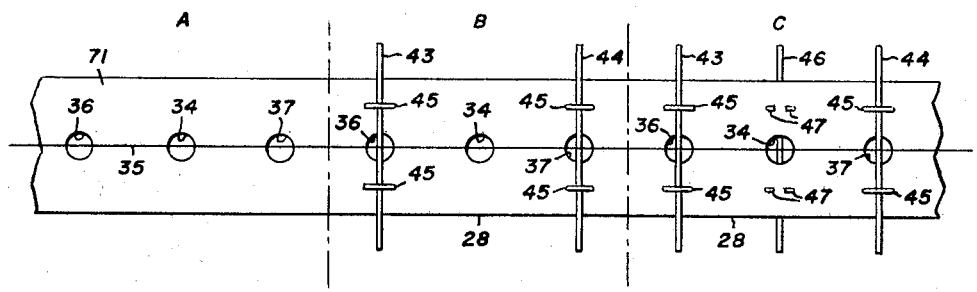
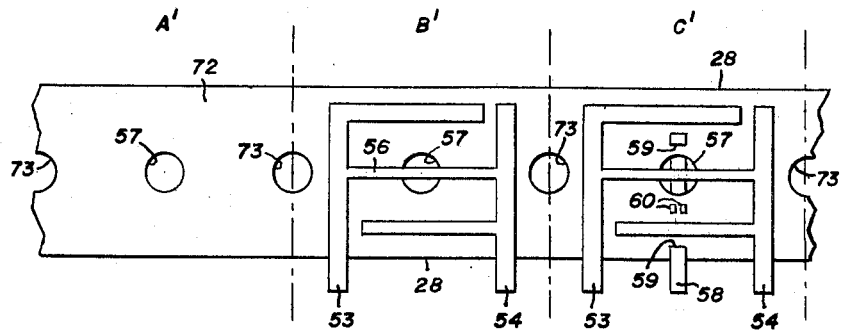
INVENTORS:
NORMAN SZEREMY,
WALTER KATUSCHENKO,
BY *Francis H. Boos, Jr.*
THEIR ATTORNEY.

United States Patent Office 3,492,534
Patented Jan. 27, 1970

3,492,534
FUSE SPARK GAP DEVICE FOR PROTECTION AGAINST LINE TRANSIENT VOLTAGES
Norman Szeremy and Walter Katuschenko, Syracuse, N.Y., assignors to General Electric Company, a corporation of New York
Filed Oct. 31, 1967, Ser. No. 685,225
Int. Cl. H02h 1/04, 3/22
U.S. Cl. 317—61.5                                11 Claims

ABSTRACT OF THE DISCLOSURE

For electronic equipment connected to a power line which might carry an occasional transient voltage pulse, a protective device comprises a thin dielectric spacer having an aperture therethrough and a thickness defining a spark gap. A first and a second conductive member are mounted on one surface of the dielectric spacer with a conductive fuse member electrically connected therebetween and spanning the aperture. Another conductive member spans the aperture on the opposing surface of the dielectric spacer thereby forming a fuse-spark gap combination. The first and second conductive members connected in series with one terminal of the power supply while the other conductive member is connected to the second terminal of the supply.

BACKGROUND OF THE INVENTION

The invention relates to a protective device for electronic equipment; more specifically, it relates to the construction of a fuse-spark gap combination to achieve protection of such equipment.

In various types of electronic equipment, including television receivers, it becomes necessary to guard against large voltage spikes on power lines which are produced by lightning strokes and/or a similar spike produced by an "inductive kick" which represents a counter electromotive force induced in the line due to a sudden interruption of line current flowing through a high inductance device. Under both these circumstances, it becomes imperative to prevent the electronic circuitry within the equipment from receiving the full voltage represented by the excursion of the spike.

In order to protect against lightning strokes and the voltage spikes produced thereby, the power industry utilizes lightning arrestors which are not completely effective. The effectiveness is diminished since each lightning pulse is so short that even the relatively low inductance of the power line would produce relatively large voltage spikes which ride the line between the point of the lightning stroke and the lightning arrestor. As a consequence, voltage spikes ranging from a few hundred volts to a number of kilovolts can reach the power input terminals of the equipment fed from the line.

The prior art, in attempting to prevent the damage produced by the voltage spikes, has achieved less than complete success. In one method, a commercial fast-blow fuse is utilized in series with the power line at the power input terminals of the electronic equipment. While the fuse is not particularly expensive, it is deficient in that presently available commercial fuses of the fast-blow variety have a fuse time of sufficient duration to create considerable risk of fire within the electronic circuitry. The risk is greatly increased in a television receiver wherein an interference filter capacitor is used in shunt with the power input terminals since the capacitor is prone to explode and produce secondary fires.

As an alternative, the prior art has sought to utilize a device which would bleed off any voltage in excess of a predetermined amount. While this alternative is theoretically sound, its practical execution has been hampered in the past by expense and improper construction of various protective devices. These devices traditionally have taken on the form of a spark gap with an appropriate critical voltage; i.e., 600 to 1200 volts, which would arc-over appropriately to bleed off the excess voltage. Under normal atmospheric conditions, a critical voltage as specified above would require an electrode spacing defining the spark gap of .004 to .006 inch. While the precise electrode spacing is not difficult to compute, it has been exceedingly difficult to maintain and control without adding undesirable cost. Furthermore, the arcing produced at the spark gap ionizes the air therein. If the arc-over occurs at or near the 60 cycle AC amplitude maximum, a very heavy momentary current is generated at the spark gap resulting in damage to the wiring installation in the immediate vicinity of the spark gap coincident with the destruction thereof.

SUMMARY OF THE INVENTION

It is therefore an object of this invention to provide an extremely low cost protective device.

It is a further object of this invention to provide a protective device with a carefully controlled breakdown voltage.

It is still a further object of this invention to provide a protective device wherein breakdown will not result in damage to adjacent circuitry.

Briefly stated, and in accordance with certain aspects of this invention, a protective device is provided including a dielectric spacer having a first surface, a second surface, and an aperture therethrough. A first conductive terminal means overlies the aperture at the first surface and a fuse means overlies the aperture at the second surface to define a spark gap therebetween and through the aperture. The fuse means is connected to a second conductive terminal means comprising a first conductive member and a second conductive member positioned on either side of the aperture.

BRIEF DESCRIPTION OF THE DRAWINGS

The specification concludes with claims particularly pointing out and distinctly claiming the subject matter which is regarded as the invention. The invention may also be understood from the following description taken in connection with the accompanying drawings in which:

FIGURE 7 is a view of the underside of the embodiment as shown in FIGURE 6;

FIGURE 8 is a cross-sectional view of the embodiment of FIGURES 6 and 7 taken along section line VIII—VIII;

FIGURE 9 is a cross-section view of the embodiment of FIGURES 6 and 7 taken along section line IX—IX;

FIGURE 10 is a representation of a manufacturing process for the embodiment as shown in FIGURE 4; and FIGURE 11 is a representation of a manufacturing process for the embodiment as shown in FIGURES 6–9.

DESCRIPTION OF THE PREFERRED EMBODIMENTS

Figure 1:
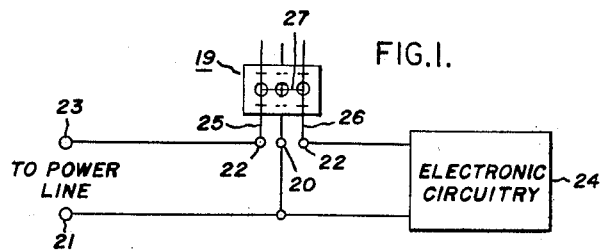
FIGURE 1 is a schematic diagram of the protective device in combination with the power supply and the electronic circuitry to be protected.

An appreciation of the protective function to be performed by the invention may, perhaps, be best appreciated by reference to FIGURE 1. Disclosed therein is a protective device 19 with a first conductive terminal means 20 connected to a first power supply input terminal 21 and a second conductive terminal means 22 connected to a second input power supply terminal 23. The second conductive terminal means comprises a first conductive member 25 and a second conductive member 26 connected by a fuse means 27 to form a fuse-spark gap combination with the first conductive terminal means 20. This combination shunts the power supply and electronic circuitry 24 to achieve the protective functions of the above-mentioned objectives.

Figure 2:
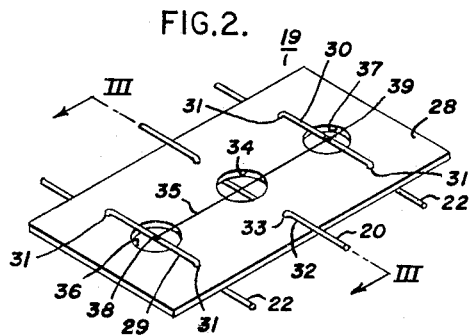
FIGURE 2 is an elevated view of a specific embodiment of the invention.

Referring now to FIGURE 2, there is disclosed a protective device 19 which includes a relatively thin dielectric spacer 28 with first and second surfaces comprising a glass epoxy material or other suitable material which serves a dual function. First, it provides a suitable low cost mounting platform for the first conductive terminal means 20 and the second conductive terminal means 22. Second, and of extreme importance, the dielectric spacer 28 controls the spacing of electrodes defining a spark-gap with a high degree of accuracy but at low cost.

The second conductive terminal means 22 comprises a first conductive member formed of a wire 29 and a second conductive member formed of a wire 30. In order to secure the wires to the dielectric spacer 28, small apertures 31 are provided to allow the wires to be threaded therethrough. The first conductive terminal means 20 comprises a wire 32 which is also secured to the dielectric spacer 28 by a similar means. More specifically, the wire 32 is theaded through small apertures 33 in the dielectric spacer 28 in order to secure it thereto.

In order to obtain a spark gap, a gap aperture 34 is provided in the dielectric spacer 28. The gap 34 is terminated by one electrode formed by electrically connecting the wire 29 to the wire 30 as the second surface of the dielectric spacer and in contact therewith via fuse wire 35 of substantially smaller diameter than the wires 29 and 30, which fuse wire 35 crosses the aperture 34. The other electrode is formed by the wire 32 which is mounted on and in contact with the first surface of the dielectric spacer 28 to oppose the fuse wire 35 through the gap aperture 34. In order to facilitate the securing of the fuse wire 35 to the first conductive terminal means 22, solder apertures 36 and 37 are provided in the dielectric spacer 28 thereby allowing the fuse wire 35 to be soldered or spotwelded with considerable ease.

As may be seen, the width of the spark gap is wholly a function of the thickness of the dielectric spacer 28. Of course, this requires that some degree of tension be maintained on the fuse wire 35 in order to retain it in the plane of the second surface of the dielectric spacer 28. This may be achieved with relatively little difficulty if the fuse wire 35 is maintained taut when spotwelded or soldered at points 38 and 39 under the wires 29 and 30 respectively.

Figure 3:
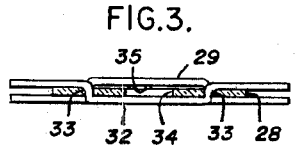
FIGURE 3 is a cross-sectional view of the embodiment of FIGURE 2 as taken along section line III—III.

Referring now to FIGURE 3, the spark gap provided at the gap aperture 34 may be readily seen to be controlled by the thickness of the dielectric spacer 28 which separates the fuse wire 35 from the wire 32. The wire 32 is pulled taut through the small apertures 33 to assure that the width of the spark gap is a function of the thickness of the dielectric spacer 28 only. Likewise, the wires 29 and 30 must be maintained in a taut condition in order to retain the fuse wire 5 on the second surface of the dielectric spacer 28.

Figure 4:
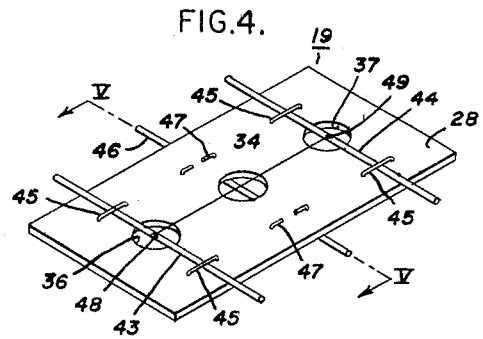
FIGURE 4 is an elevated view of another embodiment of the invention.

FIGURE 4 discloses an alternative embodiment wherein the second conductive terminal means, comprising a first conductive member or wire 43 and a second conductive member or wire 44, are secured to the dielectric spacer 28 by staples 45. Thus, the first conductive member 43 and the second conductive member 44 are stapled on the second surface of the dielectric spacer 28 with staples 45 clinched on the first surface thereof. Similarly, the first conductive means or wire 46 is secured to the first surface of the dielectric spacer by staples 47 which are clinched on the second surface thereof.

Although the configuration of the protective device 19 as disclosed in FIGURE 4 differs from that disclosed in FIGURE 2 since the first and second conductive means are each positioned on only one surface of the dielectric spacer 28 and not threaded therethrough, the spark gap achieved at the aperture 34 is identical. This spark gap may be viewed in FIGURE 5 wherein the first conductive means or wire 46 is shown as flush to the first surface of the dielectric spacer 28 while the fuse wire 32 is maintained flush to the second surface of the dielectric spacer 28. The staples 45 and 47 serve to maintain a taut condition of the wires 43 and 46 and the fuse wire is maintained in the taut condition by solder connections 48 and 49 on the wires 43 and 44 respectively. In order to facilitate the ease of connection, solder aperatures 36 and 37 are again provided.

Figure 6:
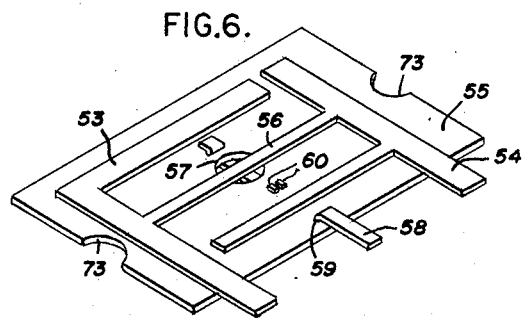
FIGURE 6 is an elevated view of another embodiment of the invention.

As shown in FIGURE 6, the first conductive terminal means and the second conductive terminal means comprise planar conductive members as opposed to the previously described wires. Furthermore, the fuse means comprises a planar conductive member formed integrally with the second conductive means. In order to achieve stability and a large area for mechanical contact to a spacer 55, the first and second conductive members of the second conductive terminal means comprise L-shaped planar members.

Because of integral fuse means and first conductive terminal means is utilized, in the form of a planar fuse member 56 joining the first L-shaped planar member 53 and the second L-shaped planar member 54 which are of substantially greater width, the need for solder apertures is eliminated and a single gap aperture 57 is utilized. As a result, the dielectric spacer 55 does include semi-circular portions of the drive apertures 73 along the edges thereof which facilitate in the manufacturing of the protective device 19. Utilization of these semi-circular portions will be discussed in greater detail below.

The first conductive terminal means 20 comprises a planer member 58 which is threaded through apertures 59 in the dielectric spacer 55 in order to securely affix it thereto. In addition, deformable tabs 60 are provided on the planar member 58 which are inserted through the spacer 55 and clinched on the second surface thereof to more securely affix the member 58 thereto.

It may be seen by reference to FIGURE 7 that the planar members 53 and 54 also include tabs 61 which are inserted through the dielectric spacer 55 and clinched on the first surface thereof. Although alternative fastening means might be utilized, the tabs 60 and 61 are inexpensive and effective.

The spark gap achieved may be viewed in FIGURE 8 wherein the first conductive terminal means 58 is separated from the fuse member 56 by the dielectric spacer 55 which controls the precise width of the gap. The apertures 59 through which the conductive member 58 is threaded are also shown along with the planar member 54 which is integral with the fuse member 56.

FIGURE 9 more fully discloses the second conductive member 53 including tabs 61 which are clinched on the first surface of the spacer 55. Also shown is a portion of the conductive member 58 which forms one electrode of the spark gap.

Note that in all embodiments, the aperture 34 is the dielectric spacer 28 or the aperture 57 in the dielectric spacer 55 serve to provide a spark gap of controlled width. This controlled width is achieved by the thickness of the dielecteric spacers 28 and 55, which thickness may be maintained within rather close tolerances at a minimum cost. Even more importantly, a fuse member in the form of the fuse wire 35 or the planar fuse member 56 has been provided to accommodate the surge in current through the spark gap again at minimal cost, which surge would otherwise produce considerable damage.

Figure 5:
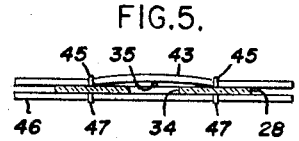
FIGURE 5 is a cross-sectional view of the embodiment of FIGURE 4 as taken along section line V—V.

In order to demonstrate the ease in manufacturing the protective device 19 which results in minimal cost, reference should be made to FIGURES 10 and 11 wherein the manufacturing process of the embodiments of FIGURES 4 and 5 and the embodiment of FIGURES 6-9 are respectively depicted. Referring first to FIGURE 10, there is disclosed a continuous strip of dielectric material 71 which is sub-divided into a plurality of dielectric spacers 28, each of which contains a single gap aperture 34 and two solder apertures 36 and 37.

In addition to providing a spark gap and simplified means for securing the fuse wire 35 to the wire 43 and the wire 44, these apertures 34, 36 and 37 serve to provide a means of advancing the dielectric strip 71 through the manufacturing process. At stage A, the dielectric strip has been punched to provide the apertures 34, 36 and 37 and the fuse wire 35 has been stretched along the centers of these apertures. In the advanced stage B of the manufacturing process, the wire 43 and the wire 44 have been affixed to the dielectric strip 71 to form the beginning of another protective device 19. These members have been affixed thereto by the stapling process as described with regard to FIGURES 4 and 5. At the more advanced stage C, the first conductive means in the form of wire 46 has been affixed to the dielectric strip 71 by the stapling process. The conductive members are shown as secured to the dielectric strip 71 by staples 45 and 47. Of course, the method of manufacturing shown in FIGURE 10 is equally suitable to the embodiments of FIGURES 2 and 3 wherein the conductive members are threaded through the dielectric spacer 28.

FIGURE 11 discloses a dielectric strip 72 comprising a plurality of spark gap apertures 57 in addition to dielectric strip drive apertures 73. These apertures will ultimately be bisected to form the individual dielectric spacers 55 resulting in the semicircular portions described with respect to the embodiments of FIGURES 6-9. At stage A in the manufacturing process, the dielecteric strip forming a first dielectric spacer 55 has been punched to form the spark gap aperture 34 in addition to the drive aperture 73. At stage B, the dielectric spacer 55 is supplied with the integral combination of the first planar member 53, the second planar member 54, and the fuse member 56. This integral combination may be provided with tabs not shown which may be clinched on the first surface of the dielectric strip 72. At stage C, the second conductive terminal member 58 is threaded through apertures 59 in the dielectric strip 72. Tabs 60, similar to those of the first planar member 53 and the second planar member 54, are presently in the unclinched condition.

As may be seen, the protective device 19 is easily manufactured and reliably produced to achieve a low cost voltage surge protection unknown to the prior art. It is, of course, appreciated that alternative means are available for securing the fuse means, the first conductive terminal means, and the second conductive terminal means to a dielectric material. It is further appreciated that the protective device 19 now claimed may be produced by alternative methods of manufacture to meet the invention as presently claimed. By disclosing a manufacturing technique, it is only intended to emphasize that the structure set forth herein may be economically produced with a high degree of accuracy.

Although specific embodiments of the invention have been shown and described, it is not desired that the invention be limited to the particular forms shown and it is contended by the appended claims to cover all modifications within the spirit and scope of the invention.

What is claimed as new and desired to be secured by the Letters Patent of the United States is:

1. A protective device comprising:
   (a) a dielectric spacer including a first surface and a second surface and having an aperture therethrough;
   (b) first conductive terminal means in contact with said first surface overlying the aperture; and
   (c) fuse means in contact with said second surface and overlying the aperture so as to form a spark gap with said first terminal conductive means.

2. A protective device as recited in claim 1 and including second terminal conductive means in contact with said second surface of said dielectric spacer and electrically connected to said fuse means.

3. A protective device as recited in claim 2 wherein said second conductive terminal means comprises a first conductive member and a second conductive member and said fuse means electrically connects said first conductive member to said second conductive member.

4. A protective device in claim 3 wherein said first conductive terminal means, said first conductive member, and said second conductive member are mounted substantially parallel to and in contact with said dielectric spacer.

5. A protective device as recited in claim 4 wherein said first conductive member and said second conductive member comprise wires, and said fuse means comprises a fuse wire of substantially lesser diameter than said wires, said fuse wire fastened to said first conductive member and said second conductive member.

6. A protective device as recited in claim 5 including a pair of staples securing at least one of said wires to said dielectric spacer.

7. A protective device of claim 6 wherein said dielectric spacer includes at least a pair of small apertures therethrough, at least one of said wires inserted through said pair of small apertures and secured to said dielectric spacer.

8. A protective device of claim 5 wherein said fuse means, said first conductive member, and said second conductive member comprise an integral planar member.

9. A protective device of claim 8 wherein said dielectric spacer has a plurality of apertures therein and said integral planar member includes deformed tabs extending normally therefrom and through the plurality of apertures.

10. A protective device of claim 9 wherein said first conductive member comprises a planar conductor.

11. In electronic equipment including a first power supply input terminal, a second power supply input terminal, and electronic circuitry, an improved protective device comprising:
   (a) a dielectric spacer including a first surface and a second surface having an aperture therethrough;
   (a) a first conductive terminal means overlying the aperture on the first surface of said dielectric spacer mounted substantially parallel to and in contact with the first surface thereof;
   (c) a fuse means overlying the aperture at the second surface of said dielectric spacer and in contact therewith so as to form a spark gap with said first conductive terminal means;
   (d) a second conductive means comprising a first conductive member and a second conductive member mounted substantially parallel to and in contact with said dielectric spacer, said fuse means electrically connecting said first conductive member to said second conductive member; and
   (e) said first conductive member connected to the second power supply input terminal, said second conductive member connected to the electronic circuitry, and said first conductive terminal means connected to the first power supply terminal.

References Cited

UNITED STATES PATENTS

| | | | |
|---|---|---|---|
| 2,299,184 | 10/1942 | Slepian et al. | 313—325 X |
| 2,365,595 | 12/1944 | Roman | 313—325 X |
| 3,045,143 | 7/1962 | Shickel | 317—61 X |
| 3,184,634 | 5/1965 | Kershaw | 315—36 |
| 3,316,467 | 4/1967 | Sperry | 317—256 |
| 3,366,831 | 1/1968 | Lapple | 315—36 |
| 3,382,402 | 5/1968 | Lafferty | 315—36 |

LEE T. HIX, Primary Examiner

S. WEINBERG, Assistant Examiner

U.S. Cl. X.R.

313—325; 315—36